United States Patent [19]

Arbogast et al.

[11] Patent Number: 4,609,913
[45] Date of Patent: Sep. 2, 1986

[54] FLUID LEVEL SENSOR

[75] Inventors: Thomas P. Arbogast, Troy; David Eilola, Southfield, both of Mich.

[73] Assignee: Wickes Manufacturing Company, Southfield, Mich.

[21] Appl. No.: 704,346

[22] Filed: Feb. 22, 1985

[51] Int. Cl.[4] .............................................. G08B 21/00
[52] U.S. Cl. ..................................... 340/622; 73/295; 323/366; 338/23; 340/599
[58] Field of Search .................. 340/622, 599; 73/295, 73/204; 323/369, 366; 338/22 R, 23

[56] References Cited

U.S. PATENT DOCUMENTS

| | | | |
|---|---|---|---|
| 3,304,278 | 2/1967 | Stuart | 73/204 |
| 3,485,100 | 12/1969 | Petersen | 73/295 |
| 3,845,443 | 10/1974 | Fisher | 338/25 |
| 3,922,658 | 11/1975 | Harper et al. | 340/622 |
| 4,053,874 | 10/1977 | Glaser | 340/622 X |
| 4,319,233 | 3/1982 | Matsuoka et al. | 73/295 X |
| 4,389,876 | 6/1983 | Szonntagh | 338/22 R X |
| 4,498,337 | 2/1985 | Gruner | 73/204 |

FOREIGN PATENT DOCUMENTS 1100774  1/1968  United Kingdom ................ 340/622

*Primary Examiner*—James L. Rowland
*Assistant Examiner*—Daniel Myer
*Attorney, Agent, or Firm*—A. Thomas Kammer

[57] ABSTRACT

A fluid level sensor utilizes thick film thermistors in a four-thermistor bridge configuration. The bridge is heated by a heater to sense the presence or absence of fluid at a particular level with respect to the thermistors. Upon energizing the bridge with a power source, the middle leads thereof are monitored for voltage separation and polarity. An indicator circuit indicates when one or more of the thermistors is submerged in the fluid. The heater influences the temperature of the thermistors to a greater or lesser extent depending upon whether or not they are submerged. Detectable changes in voltages across the bridge are accordingly produced.

8 Claims, 6 Drawing Figures

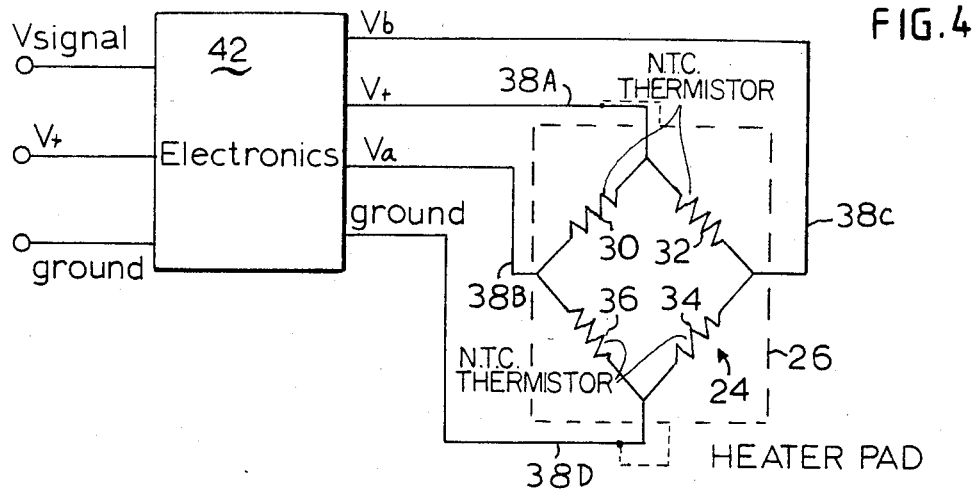
FIG.4
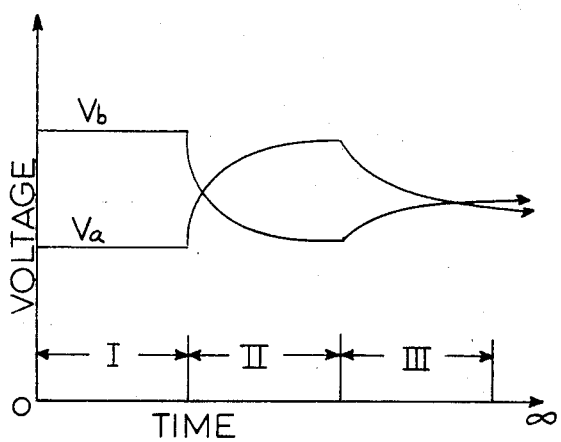
FIG.5A
FIG.5B
| CONDITION | THERMISTORS | | | | Vb - Va | V SIGNAL |
|---|---|---|---|---|---|---|
| | ① | ② | ③ | ④ | | |
| I LOW FLUID LEVEL | DRY | DRY | DRY | DRY | >1 VOLT | POSITIVE |
| II PROPER FLUID LEVEL | DRY | WET | DRY | WET | ≈ 1 VOLT | OFF |
| III OVER FILLED FLUID | WET | WET | WET | WET | ≈ 0 | POSITIVE |

FLUID LEVEL SENSOR

BACKGROUND OF THE INVENTION

1. Field of the Invention

The field of the invention relates to the detection of fluid levels within a vessel.

2. Brief Description of the Prior Art

A number of systems have been devised for detecting the fluid levels within vessels of various constructions. These include hot wire fluid sensors, solid state devices, and mechanical float devices. A capacitor sensor is employed for liquid level detection in U.S. Pat. No. 4,361,038. U.S. Pat. No. 3,350,710 discloses the use of a resistance wire in conjunction with a lamp indicator. U.S. Pat. Nos. 2,742,634 and 2,901,740 employ bridge circuits for detecting changes in various conditions. A float device is utilized in the oil level indicator disclosed in U.S. Pat. No. 2,804,517.

SUMMARY OF THE INVENTION

A fluid level sensor is provided which includes a probe having a temperature-responsive circuit positioned adjacent to a heater element or circuit. The temperature-responsive circuit may include a plurality of thermistors wired in a bridge configuration on one side of a substrate. The heater circuit is defined on the other side of the substrate. When the bridge and heater circuits are energized, the voltages on either side of the bridge are monitored. If the fluid level is correct, only the lower portion of the bridge will be immersed. Since fluid (i.e. liquid) removes heat faster than air, the immersed thermistor(s) will be cooler and will thereby affect the relative voltage outputs from the opposite sides of the bridge. Different voltage levels will also be provided if all the thermistors are immersed or in the air. These relative voltages can be utilized in a circuit that will signal an operator that the fluid level is incorrect.

The sensing element of the probe may include a thin, flat ceramic substrate having thick film thermistors on one side thereof and a heater circuit in printed circuit form on the opposite side. The thermistors are connected to a switching circuit which controls the operation of indicator means. The element and switching circuit may be incorporated as parts of a probe or dipstick assembly.

BRIEF DESCRIPTION OF THE DRAWINGS

FIG. 4 is a schematical illustration of the bridge circuit, a heating circuit adjacent thereto, and the indicator circuit;

FIG. 5A is a graph illustrating the respective voltages on either side of the bridge circuit under various conditions; and FIG. 5B is a chart indicating the signal provided by the indicator circuit under various liquid level conditions.

DETAILED DESCRIPTION OF THE INVENTION

Figure 1:
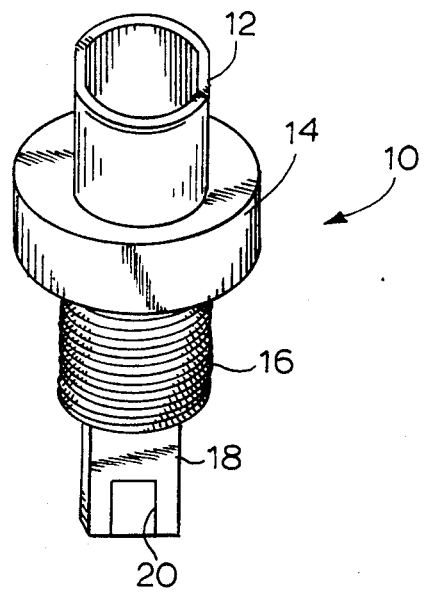
FIG. 1 is a perspective view of an assembly for detecting liquid levels within a vessel.

An oil level detection assembly 10 is shown in FIG. 1. The assembly includes a sealed three-pin (not shown) terminal connector 12, a cylindrical housing 14 including electronic components therein, a threaded seal 16 for securing the assembly to an oil-containing vessel of a motor vehicle, a probe member 18 of selected length, and a sensing element 20 mounted to the probe member.

In its preferred form, the sensing element is comprised of a two-sided ceramic (alumina) board 22 or substrate about 0.04 inches thick, a detection circuit 24 surface mounted in printed circuit form to one side of the board, and a heater circuit 26 surface mounted in printed circuit form to the opposite side thereof. The probe is insert molded in a high-temperature thermoplastic material (housing 14) with terminals as required. A fired glass glaze coating 28 forms a protective film about the board 22 and circuits 24,26. A board about two inches in length by 0.4 inches in width is of sufficient size to incorporate all of the necessary circuitry for certain applications, including an amplifier/switch circuit as discussed hereinafter. The dimensions of the board may be increased or decreased depending upon the desired physical separation of the electrical components thereof.

Figure 2:
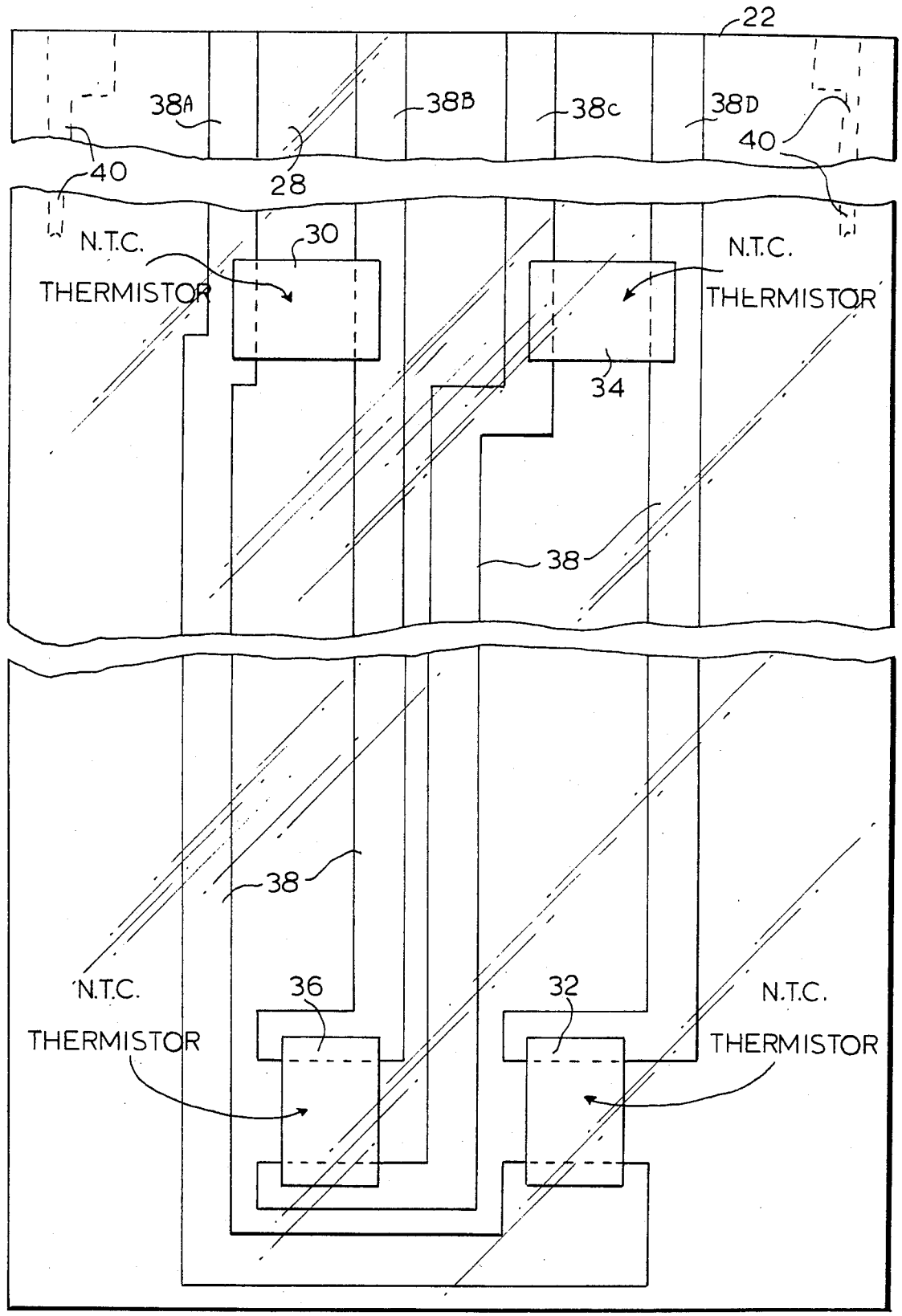
FIG. 2 is an enlarged top plan view of a four-thermistor bridge circuit mounted to a thin ceramic substrate.

As shown in FIG. 2, one side of the board 22 includes a detection circuit 24. The detection circuit preferably includes four negative temperature coefficient (NTC) thermistors 30, 32, 34 and 36 arranged in a bridge configuration by conductors 38. Alternatively, two of the thermistors (e.g. thermistors 30 and 36) could be ordinary resistors. Thermistors 30 and 34 are substantially equidistant from one end of the board as are thermistors 32 and 36. The pairs of thermistors are also positioned a selected distance from each other depending upon the levels of fluid which may define a normal operating range. The heater circuit comprises a conductor 40 arranged in a sinuous pattern so that all or only a selected portion of the board will be heated thereby. Alternatively, a positive temperature coefficient thermistor may be employed for this purpose. The resistance provided thereby may be about ten to fifty ohms in the embodiment described herein. A sufficient amount of heat is generated to influence the temperature of the NTC thermistors mounted to the opposite side of the board. The conductor traces to the heater side of the board are adapted to carry about two amps whereas those on the detector side carry up to one hundred milliamps. Each of the NTC thermistors provide between five and twenty kilo-ohms at room temperature and has a beta value of about −3950. The four NTC thermistors utilized in a particular bridge each preferably have substantially the same properties with respect to resistance as a function of temperature.

Figure 3:
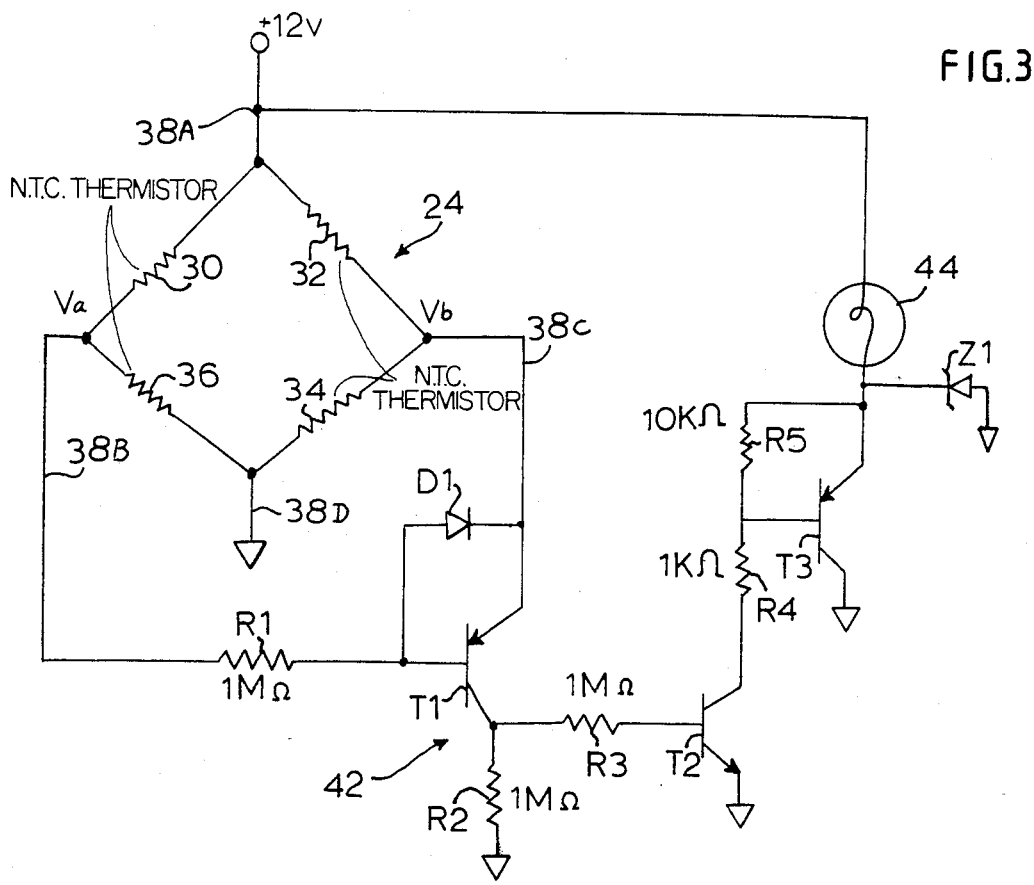
FIG. 3 is a schematic illustration of a four-thermistor bridge circuit connected to a liquid level indicator circuit.

FIGS. 3 and 4 illustrate the bridge circuit 24 in schematical form. By comparing this figure with FIG. 2, it will be appreciated that conductor 38A provides current from a power source and conductor 38D is connected to ground. Conductors 38B and 38C are employed for measuring voltages $V_a$ and $V_b$, respectively, as defined hereinafter.

A circuit 42 connected to the bridge functions as an amplifier/switch circuit which, under certain conditions, causes the operation of indicator light 44. This circuit may either be incorporated upon board 22 or located remotely therefrom. A standard PC board (not shown) may be employed therefor if it is not printed upon the same alumina board as the heating and detection circuits. An indicator light is connected between a power source and the emitter of a PNP transistor T3. When current is caused to flow from the emitter of this transistor to ground through the collector thereof, the light will indicate an incorrect liquid level. The remaining part of the circuit 42 determines whether this occurs. Zener diode Z1 protects the transistor T3 against over-voltage conditions.

Conductor 38B is connected to the base of a PNP transistor T1 through a one meg-ohm resistor R1. Conductor 38C is connected to the emitter of this transistor. The collector of transistor T1 is connected both to ground and to the base of an NPN transistor T2 through resistors R2 and R3, respectively. The collector of transistor T2 is connected to the base of transistor T3 through a one kilo-ohm resistor R4. A ten kilo-ohm resistor R5 is connected in series with resistor R4 and the conductor from light 44. A diode D1 is provided for protecting transistor T1 should $V_a$ exceed $V_b$.

The circuit 42 should preferably cause the indicator light 44 to function only if $V_b$ exceeds $V_a$ by a predetermined voltage. Transistor T1 accordingly has a threshhold voltage below which it will not conduct. This voltage may be in the range of 0.5 to 1.0 volts.

When all four thermistors are exposed to the air, such as in a low fluid level situation, voltage $V_b$ will exceed voltage $V_a$ since the low end of the board, carrying thermistors 32 and 36, is heated more than the upper end of the board. Thermistors 32 and 36 are accordingly warmer than thermistors 30 and 34 which produces a voltage differential across the bridge. Current flows through transistors T1 and T2 and turns on transistor T3. Once so actuated, transistor T3 allows current to flow through the indicator light 44 to ground.

If the fluid level is within the acceptable range, thermistors 30 and 34 will be in air while only thermistors 32 and 36 are immersed. This results in the latter thermistors being cooler than the upper pair since heat is more readily absorbed by fluid than air. $V_a$ will accordingly exceed $V_b$ and no current will be conducted by transistor T1. The indicator light is not actuated under these conditions.

The circuit 42 may be modified to provide a signal when a vessel is overfilled. Under this condition, all four of the NTC thermistors will be submerged. The heater circuit 26 has much less effect thereon as compared to when these components are all suspended in air. As shown in the graph in FIG. 5A, $V_b$ will only slightly exceed $V_a$. Since substantially different voltages are produced under low, normal, and high liquid levels, the circuit may be adapted to provide a signal under both low and high levels. Alternatively, different signals may be produced to differentiate between low and high levels.

It will be appreciated that any number of thermistors may be employed to indicate a plurality of fluid levels if necessary or desirable. By incorporating circuit 42 within housing 14 or upon board 22, a complete detection assembly can be provided which requires connection only to the power source and the indicator light. This greatly simplifies installation. The sensing element 20 may be positioned within a cylindrical enclosure to allow more accurate readings in turbulent liquids.

In another possible modification of the invention, the indicator light may be omitted together with elements R4, R5 and T3 in order to send a pulse width modulated signal to the computer of a motor vehicle. An appropriate message can thereby be displayed upon the vehicle's dashboard concerning the particular fluid level (e.g. crankcase oil, transmission fluid, brake fluid, coolant) which is being monitored. Where maintenance of a particular fluid level is critical to the vehicle's operation, such as with transmission fluid, a signal from the circuit may be employed to actuate a pump which draws the fluid from a sump or other reserve to the location where it is needed.

What is claimed is:

1. A liquid level sensor comprising:
   a probe;
   a thin, flat, heat-conducting substrate having a first end mounted to said probe and a second free end opposite to said first end;
   a bridge circuit deposited upon said substrate, said bridge circuit including first, second, third and fourth thermistors, two of said thermistors being positioned relatively closer to said second free end of said substrate than the other two of said thermistors such that the first mentioned two of said thermistors may be submerged within a liquid while said other two of said thermistors remain outside thereof;
   heating means deposited upon said substrate for heating substantially all of said substrate and all four of said thermistors;
   a first pair of conductors connected to said bridge circuit for connecting said bridge circuit between a voltage source and ground; and
   a second pair of conductors connected across said bridge circuit for connection to a detection circuit;
   whereby said second free end of said substrate and said two thermistors positioned relatively closer to said second free end are heated more than said first end of said substrate and the other two of said thermistors when said heating means is actuated and said substrate, including said four thermistors, is entirely exposed to the air.

2. A sensor as defined in claim 1 including a detection circuit connected between said second pair of conductors, said detection circuit including a first PNP transistor, one of said second pair of conductors being connected to the base of said first PNP transistor, the other of said second pair of conductors being connected to the emitter of said first PNP transistor, a second NPN transistor, the collector of said first PNP transistor being connected to the base of said second NPN transistor, a voltage source, an indicator connected between said voltage source and ground, a third transistor for controlling the operation of said indicator, the collector of said second NPN transistor being connected to said third transistor.

3. A sensor as defined in claim 1 wherein all of said thermistors are negative temperature coefficient thermistors.

4. A sensor as defined in claim 3 wherein all of said thermistors have substantially the same resistance at room temperature and vary in resistance in substantially the same manner as a function of temperature change.

5. A sensor as defined in claim 1 wherein said substrate is a flat, non-metallic board having first and second sides, said bridge circuit being positioned upon said first side thereof and said heating means positioned upon said second side.

6. A sensor as defined in claim 1 including a thin, glass film encasing said substrate, said bridge circuit, and said heating means.

7. A sensor as defined in claim 1 wherein said first mentioned two of said thermistors are substantially equally spaced from said second end of said substrate.

8. A sensor as defined in claim 7 including a thin, glass film encasing said substrate, said bridge circuit, and said heating means.

* * * * *